Feb. 8, 1966     A. T. STRAND     3,233,630
MULTIPLE PORT VALVE WITH SELECTIVE CLOSING OPERATOR
Filed May 7, 1962     2 Sheets-Sheet 1

INVENTOR
ALBERT THOMAS STRAND
BY
ATTORNEY

Feb. 8, 1966   A. T. STRAND   3,233,630
MULTIPLE PORT VALVE WITH SELECTIVE CLOSING OPERATOR
Filed May 7, 1962   2 Sheets-Sheet 2

INVENTOR
ALBERT THOMAS STRAND

BY
ATTORNEY

United States Patent Office 3,233,630
Patented Feb. 8, 1966

3,233,630
MULTIPLE PORT VALVE WITH SELECTIVE
CLOSING OPERATOR
Albert Thomas Strand, Sherwood Park, Wilmington, Del., assignor to E. I. du Pont de Nemours and Company, Wilmington, Del., a corporation of Delaware
Filed May 7, 1962, Ser. No. 193,658
7 Claims. (Cl. 137—625.17)

This invention relates to fluid flow controlling valves and, in particular, to a class of central plug cock, multi-port valves especially useful in handling polymeric fluids and capable of controlling flow in such a manner that no stagnant fluid dead ends or pockets of delayed fluid flow exist or are brought about by valve actuation within the valve body where e.g., polymer gel would be formed. These valves also provide for shutting off flow to or from one or more ports, without even momentarily interrupting flow to other port or ports, so that the port or ports shut off can be cleaned and the port opening plugged, thus allowing the valves to continue to be used to control flow to or from other ports.

The prevention of agglomeration or gel formation is important in the control of flow for many fluids. For instance, in the control of the flow of molten polymer from the polymerization step through transfer lines to yarn spinning machines, the formation of gel can cause serious undesirable interruptions in the spinning of yarn. Many times in current practice it is desired to furnish molten polymer from one source to more than one spinning position, and it becomes necessary to shut off flow to one position without altering in any way the flow to the remaining active positions. Because of these requirements, prior art valves have not been found to be satisfactory in such applications.

It is an object of this invention to provide improved valve means for controlling fluid flow from one input port to multiple exit ports, and at the same time, provide no stagnant dead ends or pockets of delayed flow.

Another object is to provide a valve means for fluid distribution to or from multiple ports and simultaneously to provide means for shutting off one or more of the ports while the valve is in operation under full pressure, and with full uninterrupted flow to or from the remaining ports.

The aforementioned objects are accomplished by valve units embodying features of this invention, which units generally comprise a valve body with one axial end port and multiple side ports; a central tapered plug cock with a contoured end extension or tip; and, optionally, a flow passage angled through the tapered body of the cock; means for moving the plug cock axially to a position substantially clear of the side ports; means for rotating the plug cock; means for returning the plug cock axially to block the desired side port, all motion accomplished while continuous flow under full pressure is maintained to all other ports without stagnant flow pockets; and an extended valve stem packing means may be provided, extending upward from the other end of said plug cock concentric therewith and of the same diameter; said packing movable axially and rotatable with the plug cock. In addition means may be provided to prevent rotation of the plug cock unless it is sufficiently or substantially clear of the side ports.

Additional objects and advantages will appear upon a review of the following specification and claims taken in conjunction with the accompanying drawings in which:

Figure 1:
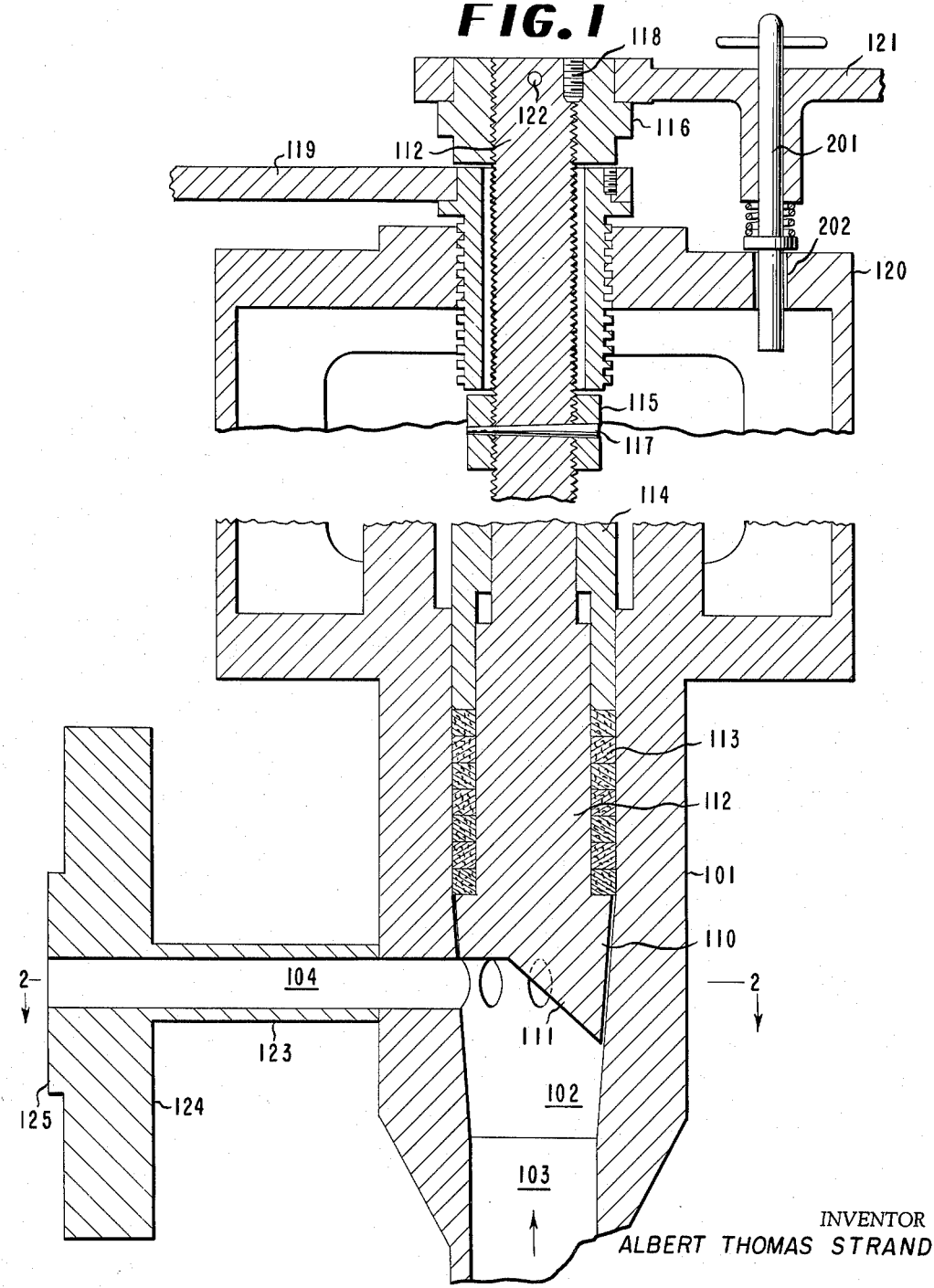
FIGURE 1 is a partial cross-sectional longitudinal view of a multi-port valve unit of the distribution type.
Figure 2:
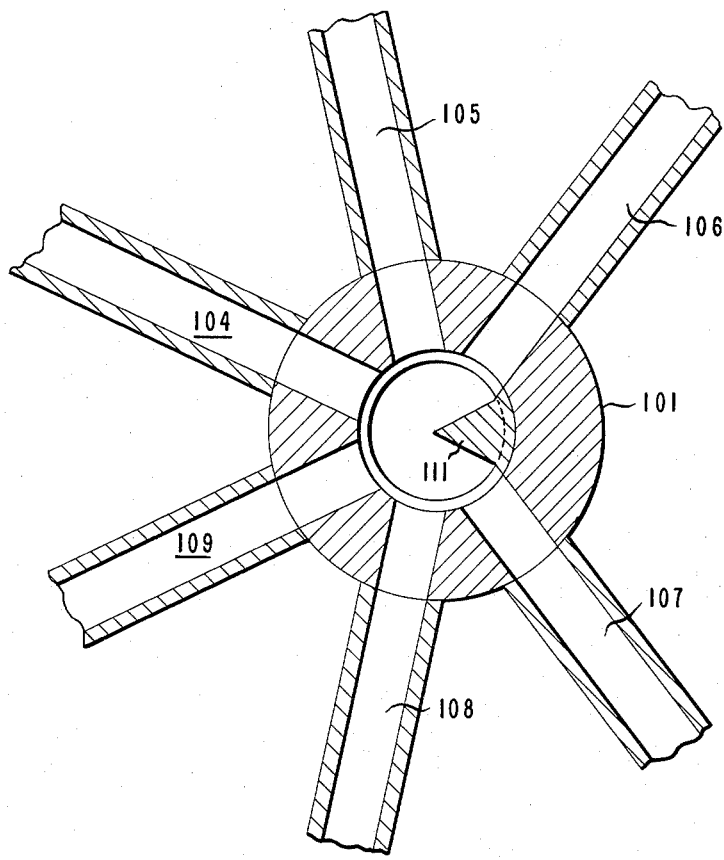
FIGURE 2 is a partial transverse cross section through line 2—2 of the valve unit of FIGURE 1.
Figure 3:
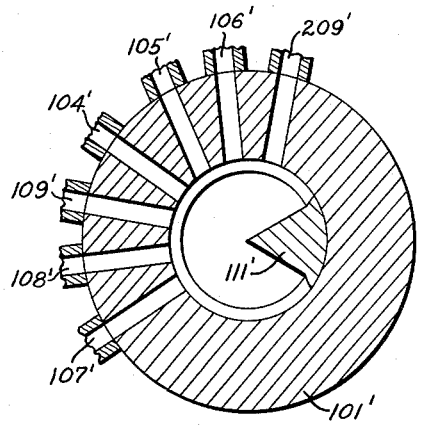
FIGURE 3 is a similar view to FIGURE 2 but showing a modified unit in which more than one port can be blocked off at one time.

A preferred embodiment of this invention representing a class of distribution valves is shown semi-schematically in FIGURE 1 and FIGURE 2. A minor modification of the units of FIGURES 1 and 2 is shown in FIGURE 3. Referring to those figures, the valve unit comprises a valve body 101 having a central cavity 102 with an inlet port 103 and multiple outlet ports 104, 105, 106, 107, 108 and 109, the number of ports being optional; said cavity tapered to receive a tapered plug cock 110 with shaped tip 111 and stem 112, said stem carrying an elongated packing 113 held under compression by a collar 114 and locking nuts, not shown; said packing movable axially and rotatably with said stem; the upper end of said stem having threaded thereto a lower collar 115 and upper collar 116 fixed by pin 117 and set screw 118 respectively to said stem after adjustment in first operation, said collars having a jacking nut 119 located axially interposed; said jacking nut threaded to the upper end of a valve yoke 120; a reversible ratchet wrench, or similar well known means, for rotating said jacking nut; a valve rotating handle 121 fixed to valve stem 112 by a means such as dowel 122 after adjustment in first operation for alignment with the tip of the plug cock; each outlet port extended by a length of pipe 123 terminated by a flange 124, said flange having a machined boss 125 on its outer surface. If desired, contour plugs may be provided fitted and marked for each outlet, each of said contour plugs having a cylindrical plug body fitted to appropriate outlet and a contoured end shaped to match the curvature and taper of the plug cock 110; the other end of said plug body terminating in a flange drilled for bolting to flange of appropriate outlet; and having a machined boss with gasketing to form a fluid tight seal when bolted to appropriate outlet flange. Such plug body being of sufficient length that when the contour plug is installed and bolted to compress packing to normal extent, the contour end will extend into appropriate outlet port with minimum clearance with plug cock 110 to permit plug cock to be rotated when jacked up and yet allow minimum clearance when plug cock is subsequently jacked down with tip 111 either in alignment with said contour plug end or in any other operating position.

A detent stop pin 201 is suitably mounted in valve rotating handle 121 and engages at one end in a recess 202 in valve yoke 120 to positively prevent rotation of the plug cock 110 until the cock has been axially displaced a sufficient amount for the tip 111 to substantially clear all of the side ports 104.

In operation, the valve units of this invention, normally serve to distribute flow uniformly from the inlet 103 to the outlets 104, 105, etc., with no stagnant pockets below or above the cock. When it is desired to shut off one exit port, the plug cock 110 is jacked up until the shaped tip of the cock is substantially clear of all the exit ports and pin 201 may be removed from the recess 202 in valve yoke 120. The cock is then rotated until the shaped tip of said cock is in vertical alignment with the exit port to be closed, and then jacked down to cover said port. This is accomplished without interfering, even momentarily, with the flow to the other exit ports. Now the closed port and its associated line can be disconnected at flange 124 and cleaned. Then, if desired, a fitted contour plug as discussed previously can be inserted and its flange bolted to the outlet flange 124 so that the plug cock can again be jacked up, rotated and jacked down either to its idle position as shown in FIGURES 1 and 2 or to a position to cover another port which is to be shut off, cleaned and plugged, if desired, without interrupting flow to the remaining open ports. Obviously the tip of the cock can be positioned in the manner described to vary the flow through one or more of the exit ports without completely shutting off flow through the port or ports concerned.

In operation, these valves may be employed to control the flow either with fluid entering the central end port and flowing out through one or more of the side ports or the reverse with fluid entering one or more side ports and flowing out through the central end port.

By simple modifications in the angular location of the side ports, shape of the plug cock tip, and/or by addition of axially displaced auxiliary side ports with or without passageways angled through the plug cock, valves of a wide variety of applications can readily be made which fall within the disclosed teachings of this invention. Included among these are valves for progressively varying flow to one port without disturbing flow to a second port; proportionally combining the flow from two ports; sampling the flow for intervals as desired by successively diverting or shutting off flow to a small sampling port or ports; optionally injecting additives to the main flow stream within the valve; and selectively directing the flow through external bypass routes and back through the valve.

It will be seen that a novel and useful type of valve unit has been provided having the following advantages: direct effective valve actuation under full pressure with no stagnant dead ends above or below the central plug cock and not even momentary interruption of flow through any port except that being cut off; provision for disconnecting, cleaning and plugging an idle port or in turn several ports; possible provision for proportioning fluid flow between two ports; provision for direction of flow either in at the central end port and out the side ports or the reverse; and a simple, yet effective and reliable, arrangement of ports.

It is apparent that many changes and modifications may be made in the disclosed apparatus without departing from the spirit of the present invention which is therefore intended to be limited only by the scope of the appended claims.

I claim:

1. An improved valve unit for controlling fluid flow, said unit comprising an elongated valve body provided with a longitudinally extending internal passageway, said passageway communicating with a first port formed in said valve body, said passageway communicating with a plurality of at least three second ports laterally disposed and formed in said valve body at a location longitudinally spaced from said first port, said passageway constructed and arranged to freely conduct a fluid between said first and said second ports, a movable valve element slidably fitted in said passageway for a first type movement between a first position and a second position longitudinally spaced from said first position and from said second ports, said valve element mounted for a second type movement in said passageway to selectively block at least one of said second ports when in said first position, and a valve element actuating means operatively connected with said valve element for selectively moving said element in the passageway sufficiently in both types of movement from one position in the passageway to another position in the passageway operatively blocking a predetermined combination of said second ports while concurrently maintaining all other of said second ports continuously in totally unblocked condition and preventing even momentary interruption of flow of fluid through such other ports.

2. The improved unit of claim 1 which further comprises a fluid sealing means acting between and cooperating with said valve element and the interior of the valve body forming said passageway to prevent flow of fluid along the element between the element and said valve body.

3. The improved unit of claim 2 in which said passageway comprises a bore, and said valve element comprises a portion slidably and rotatably fitted within said bore, and a contoured blocking tip constructed and arranged to cooperate with the interior surface of said passageway at said first position to selectively block said predetermined combination of said second ports.

4. The improved unit of claim 3 in which said sealing means comprises at least one substantially annular fluid sealing element positioned in an annular recess formed in said portion of said valve element.

5. The improved valve unit of claim 3 in which said valve element actuating means comprises a first mechanism operatively connected with said element for longitudinally moving said valve element between said first and second positions, and a second mechanism cooperating with said first mechanism and operatively connected with said element for selectively rotating said element about its longitudinal axis in said passageway to any angular position in said passageway when at said second position.

6. The improved valve unit of claim 5 which further comprises a control means cooperating with said first and second mechanisms to render said second mechanism inoperative when said valve element is in said first position.

7. An improved valve unit for controlling fluid flow, said unit comprising an elongated valve body provided with a longitudinally extending internal passageway, said passageway communicating with a first port formed in said valve body, said passageway communicating with a plurality of second ports laterally disposed and formed in said valve body at a location longitudinally spaced from said first port, said passageway constructed and arranged to freely conduct a fluid between said first and said second ports, a movable valve element slidably fitted in said passageway for a first type movement between a first position and a second position longitudinally spaced from said first position and from said second ports, said valve element mounted for a second type movement in said passageway to selectively block at least one of said second ports when in said first position, and a valve element actuating means operatively connected with said valve element for selectively moving said element in the passageway sufficiently in both types of movement from one position in the passageway to another position in the passageway operatively blocking a predetermined combination of said second ports while concurrently maintaining all other of said second ports continuously in totally unblocked condition and preventing even momentary interruption of flow of fluid through such other ports, said unit further comprising a fluid sealing means acting between and cooperating with said valve element and the interior of the valve body forming said passageway to prevent flow of fluid along the element between the element and said valve body, and said passageway comprising a bore, and said valve element comprising a portion slidably and rotatably fitted within said bore, and a contoured blocking tip constructed and arranged to cooperate with the interior surface of said passageway at said first position to selectively block said predetermined combination of said second ports, said sealing means comprising at least one substantially annular fluid sealing element positioned in an annular recess formed in said portion of said valve element, said valve element actuating means comprising a first mechanism operatively connected with said element for longitudinally moving said valve element between said first and second positions, and a second mechanism cooperating with said first mechanism and operatively connected with said element for selectively rotating said element about its longitudinal axis in said passageway to any angular position in said passageway when at said second position.

References Cited by the Examiner
UNITED STATES PATENTS

| 313,883 | 3/1885 | Prentice | 137—625.47 X |
| 733,905 | 7/1903 | Erdman | 251—188 |
| 1,555,948 | 10/1925 | Engel | 137—625.16 |
| 1,921,846 | 8/1933 | Sparks | 251—164 X |
| 1,982,644 | 12/1934 | Florez | 137—625.11 X |

M. CARY NELSON, *Primary Examiner.*

MILTON J. KAUFMAN, *Examiner.*